United States Patent [19]

Anders

[11] 4,214,859
[45] Jul. 29, 1980

[54] APPARATUS FOR REGULATING THE OUTPUT OF A SINGLE OR TWIN SCREW EXTRUDER FOR PROCESSING PLASTICS MELTS

[75] Inventor: Dietmar Anders, Hannover, Fed. Rep. of Germany

[73] Assignee: Hermann Berstorff Maschinenbau GmbH, Hanover, Fed. Rep. of Germany

[21] Appl. No.: 971,591

[22] Filed: Dec. 20, 1978

[30] Foreign Application Priority Data

Dec. 27, 1977 [DE] Fed. Rep. of Germany ....... 2758266

[51] Int. Cl.² ................................................. B29F 3/06
[52] U.S. Cl. ...................................... 425/147; 264/40.7; 366/151; 366/156; 425/376 A
[58] Field of Search ............ 425/145, 146, 147, 376 R, 425/376 A; 264/40.7; 366/151, 153, 156

[56] References Cited

U.S. PATENT DOCUMENTS

| | | | |
|---|---|---|---|
| 3,070,836 | 1/1963 | DeHaven | 264/40.7 |
| 3,158,900 | 12/1964 | Heston | 425/376 R |
| 3,704,972 | 12/1972 | Kneller et al. | 425/145 |

FOREIGN PATENT DOCUMENTS 51-9149  1/1976  Japan ..................... 425/376 A

*Primary Examiner*—Jeffery R. Thurlow
*Attorney, Agent, or Firm*—Schwartz, Jeffery, Schwaab, Mack, Blumenthal & Koch

[57] ABSTRACT

Regulating apparatus for the output of an extruder so that the output can be varied to follow variations in the output of a polymerization system supplying melt to the extruder, the apparatus including filling level measuring means in a melt container feeding an intake opening of the extruder and itself supplied with melt by the polymerization system and a flow restrictor provided in the extruder cylinder between the intake opening and a discharge opening, the extent of the restriction of flow provided by the flow restrictor being adjusted in accordance with signals received from the filling level measuring means and the extruder having an output capacity such that, with the flow restriction reduced to zero, the extruder can process the maximum output capacity of the polymerization system.

1 Claim, 1 Drawing Figure

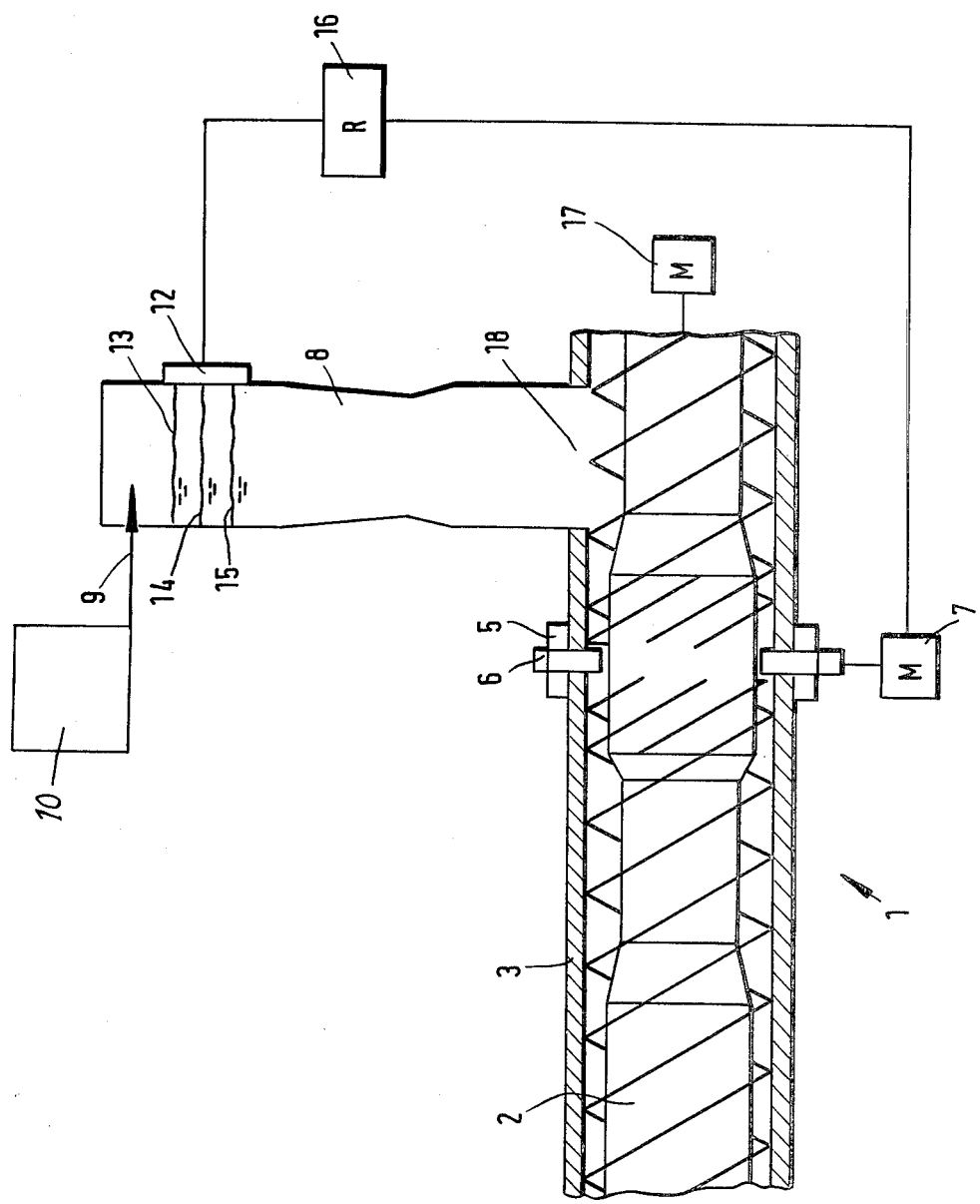

APPARATUS FOR REGULATING THE OUTPUT OF A SINGLE OR TWIN SCREW EXTRUDER FOR PROCESSING PLASTICS MELTS

The invention relates to an apparatus for regulating the output of a single or twin screw extruder for processing plastics melts, having a melt container disposed on the intake opening thereof and supplied by a polymerisation system.

With regard to output, polymerisation systems are subject to fluctuations which can only be eliminated by a disproportionately great effort. For this reason the output capacity of an extruder downstream of a polymerisation system is adapted to the respective quantity produced by altering the rotational speed of the screw and the extruder is usually driven by direct current motors so that the speed can easily be adjusted, other variable speed motors also being used to some extent, however, as well as mechanical, electrical, or hydraulic means for varying the rotational speed.

It is easier to vary the speed of direct current motors but these motors do, however, have the great disadvantage that they necessitate very expensive rectifiers and must be made spark-proof by means of complicated special constructions, such as, for example, gas-tight encapsulation, if they are to be used, as is frequently the case, in areas endangered by the risk of explosion. Thus, the use of direct current motors involves considerably higher investment costs.

The use of squirrel-cage induction motors certainly eliminates the need for complicated rectifiers and spark proofing measures become considerably simpler, however, very complicated and expensive mechanical variable speed gearing or electrodynamic or hydraulic means for speed variation are required in order to adapt the rotational speed of the screw to fluctuations in the output of the polymerisation system, so that stepless variation of the rotational speed of the screw, which thereby permits the extruder to be adapted to the output of the polymerisation system, is made possible.

Both possibilities described above for adapting the extruder to the output capacity of the polymerisation system by varying the rotational speed of the screw are extremely expensive, require considerable space and involve high maintenance and personnel costs.

In order to overcome the above described disadvantages, attempts have also been made to run an extruder at a constant maximum speed and to adapt the discharge quantity of the extruder to the fluctuations in the polymerisation system by means of a cut-off slide valve disposed at the outlet of the separator or in the extruder hopper.

If one considers that in a system for manufacturing high pressure polyethylene, for example, the viscosities of different product types may be between two and three powers of ten apart when they leave the polymerisation system, then one will easily understand that no single type of cut-off slide valve can guarantee a sensitively adjusted, even supply of melt to the extruder for an entire production range and different product temperatures.

It has been observed that extruders pulsate very strongly due to an uneven supply of melt to the extruder - caused partly by variations in temperatures and thus of viscosities of the melt inside the melt container. In view of this circumstance the output capacity of an extruder can fluctuate so much that unevenly dimensioned granules of plastics material are produced by the extruder, which renders the further processing of the granulate extremely difficult.

A further disadvantage of the use of cut-off slide valves lies in the fact that they require a high excess pressure to overcome the resistance to flow in the melt container, which excess pressure would not be required in the region of the intake zone during unrestricted operation, i.e. without a slide valve or when the slide valve is fully opened and the screw is completely filled. Due to the increased pressure in the melt container, however, the degassing of monomer therefrom is poorer, since the quantity of non-polymerised ethylene gas released in the melt in high pressure polyethylene is directly dependent on the absolute pressure in the melt container.

Exacting demands imposed with regard to environmental pollution with ethylene reflect attempts made to keep the quantity of monomer contained in polyethylene and later diffused out of the granulate as low as possible. In order to keep residual monomer contents in the granulate to a minimum, it is not only necessary to maintain the lowest possible pressure in the separator, i.e. in the melt container, but it may even be necessary to degas the melt inside the extruder additionally, i.e. to expose it to vacuum pressure. Naturally, this method of operation presupposes the use of a degassing screw, i.e. partial filling of the pitches of the thread in the region of a degassing opening.

The invention has among its objects to ovecome the disadvantages set out above and to co-ordinate an extruder exactly with the output capacity of a polymerisation system, so that it operates reliably independently of viscosity fluctuations in the material, does not require high investment or extensive maintenance and reduces the number of service personnel.

The solution provided by the invention comprises the provision of apparatus for regulating the output of an extruder for processing plastics melt, said extruder having an extruder cylinder; an extruder screw disposed in said cylinder; a melt intake opening in said cylinder; a melt container disposed at said intake opening; filling level measuring means for said melt container; a polymerisation system to supply melt to said melt container; a discharge opening for said cylinder; a flow restrictor disposed in said cylinder between said melt intake opening and said discharge opening, said flow restrictor being formed by pins which are radially movable through the wall of said cylinder towards said screw; and control means; said control means controlling the depth of plunge of the pins forming said flow restrictor in dependence on the filling level of the material in said melt container as measured by said filling level measuring means and said extruder being so dimensioned with regard to its output capacity that when said flow restrictor is fully open at least the maximum output capacity of the polymerisation system can be processed.

When fluctuations in the output of the polymerisation system lead to the level of melt in the melt container rising, then the resulting signal from the filling level measuring means disposed in the melt container is transmitted to the control means, which causes the pins of the restrictor to be withdrawn further from the extruder cylinder than previously, so that more plastics melt is conveyed through the short intake zone of the screw into the following extruder cylinder.

This step causes the level of melt in the melt container to fall again.

By choosing a suitable timing relationship for the control means, which is within the scope of the man skilled in the art, and by the appropriate dimensioning of the screw and the restrictor, the level in the melt container can automatically be constantly maintained within a given admissible range and the output capacity of the extruder can thus be adapted to the output of the polymerisation system without necessiating complicated adjustable drive means, which require considerable space, for the stepless adjustment of the rotational speed of the extruder screw. The conveying capacity of the first short section of the screw situated beneath the intake opening of the extruder depends upon the pressure upstream of the restrictor and the viscosity of the melt. However, since the quantity of material flowing through the restrictor also depends upon the viscosity, the discharge capacity of the extruder is determined relatively independently of the viscosity by the cross-section available for flow of melt in the region of the restrictor.

The advantages of the apparatus of the invention for regulating the output of the extruder become particularly apparent when very large extruders and thus very large drive means and gears are used. Extruders of this kind, which can be used, for example, to improve the quality of high pressure polyethylene melt, may have a screw diameter, D, of 600 mm, a power consumption of 4,000 kw and an output of 20,000 kg/h. The extruder screw used in this case has a length equal to 24 D i.e. 14.40 m.

One embodiment of apparatus according to the invention for regulating the output of an extruder for processing plastics melt is shown by way of example in the accompanying drawing.

Referring to the drawing, an extruder 1 comprises a screw 2 and an extruder cylinder 3. A restrictor 5 comprises pins 6 radially movable inwardly towards the screw 2 and disposed at regular distances peripherally around the extruder cylinder 3 to project through the wall of the cylinder 3. The pins 6 can be pushed through or withdrawn from the wall of the cylinder 3 by drive means 7.

The plunging movement of the pins 6 may be effected by various means within the knowledge of a man skilled in the art. For example, a rotatably mounted toothed ring may be provided on the outer face of the wall of the cylinder 3 beside the restrictor 5, curved cam tracks being disposed on lateral surfaces of said ring facing the pins 6 and engaging co-operating curved cam followers in mounts for the pins 6. According to this construction the toothed ring itself is caused to rotate by a pinion of a motor of the drive means 7. If, for example, the pins 6 are to be moved towards the screw 2, then the motor is energised and its pinion causes the toothed ring with its lateral cam tracks to rotate through a determined distance. Since the cam tracks engage the co-operating cam followers of the mounts of the pins 6, the rotation of the toothed ring causes the pins 6 to move, for example, towards the screw. Naturally, the plunging movement of the pins 6 may alternatively be adjusted by hydraulic or pneumatic means if desired, in which case the pins would be interconnected by means of suitable pressure lines and regulating means.

A melt container 8 can receive plastics melt, which enters the container 8 through a melt inlet 9 from a polymerisation system 10.

Filling level measuring means 12 on the melt container 8 transmits signals to control means 16 according to the respective filling levels 13, 14 and 15.

If, for example, the filling level measuring means 12 signals that the melt is at level 13 in the melt container 8, then the restrictor 5 is controlled by the control means 16 in accordance with this signal so that the pins 6 are moved outwardly of the extruder cylinder 3. Such outward movement of the pins 6, disposed peripherally around the screw 2 and at regular distances from one another, increases the annular cross-section of the extruder cylinder 3 available for flow and thus more material passes through the restrictor 5 than previously, whereby the melt level in the melt container 8 drops to its middle level 14.

If further fluctuations in the output of the polymerisation system 10 lead to less plastics melt entering the melt container 8 and the melt level dropping to the lower level 15, then the filling level measuring means 12 signals this condition to the control means 16. The control means 16 thereupon transmits a signal to the motor of the drive means 7 to cause it to move the pins 6 of the restrictor 5 radially towards the screw. This step causes the cross-section in the extruder cylinder available for flow to be reduced and the melt level in the melt container 8 thus rises.

Controlling the depth of plunge of the pins 6 of the restrictor 5 thus compensates output fluctuations of the polymerisation system 10 without having to vary the rotational speed of the screw 2. The invention thus enables the extruder system to be adapted in the most simple manner to the output capacity of the polymerisation system 10 without having to accept any pulsation phenomena in the extruder and the disadvantages connected therewith.

The extruder output can only be fully adapted to the output of the polymerisation system 10 if the extruder has the capacity to process at least the maximum output of the polymerisation system 10 when the restrictor 5 is fully open. This ensures that the apparatus of the invention for regulating the output remains operable even if the uppermost output limit of the polymerisation system 10 should be reached.

In particular the arrangement of the restrictor 5 in the extruder 1 offers the fundamental advantage that an exact and sensitive adjustment of the output quantity can be made despite the viscosities of the melt emerging from the polymerisation system 10 which can fluctuate by factors as high as ten.

When the through flow cross-section is constant then both the quantity of flow through a nozzle (comparable here with the restrictor 5) and the conveying capacity of the screw 2 are dependent on the viscosity.

For this reason the output capacity, particularly in short conveying sections, depends to a large extent on the free cross-section of the restrictor but is almost completely independent of the viscosity of the melt.

If, in contrast, an attempt is made to regulate the output capacity by means of a cut-off slide valve in the supply of melt to the extruder, then the quantity flowing through the slide valve is certainly also dependent upon the free through-flow cross-section and the supply pressure, but is even more dependent upon the viscosity, which has a particularly exponential effect in intrinsically viscous materials.

The arrangement according to the invention of the restrictor in the region of the cylinder, for example at the screw tip or halfway along the screw, thus enables the extruder output to be adapted to fluctuations in the output of the polymerisation system, this condition functioning reliably to a large extent independently of fluctuations in the viscosity of the melt.

What is claimed is:

1. Apparatus for regulating the output of an extruder for processing plastics melt, said extruder having an extruder cylinder; an extruder screw disposed in said cylinder; a melt intake opening in said cylinder; a melt container disposed at said intake opening; filling level measuring means for said melt container; a polymerisation system to supply melt to said melt container; a discharge opening for said cylinder; a flow restrictor disposed in said cylinder between said melt intake opening and said discharge opening, said flow restrictor being formed by pins which are radially movable through the wall of said cylinder towards said screw; means for moving said pins; and control means operatively connected between said filling level measuring means and said means for moving said pins, whereby the means for moving said pins and thus the depth of plunge of said pins towards said screw is controlled by said control means in response to the filling level of the material in said melt container, said extruder being so dimensioned with regard to its output capacity that when said flow restrictor is fully open at least the maximum output capacity of the polymerisation system can be processed.

* * * * *